United States Patent
Iino

(10) Patent No.: US 7,792,457 B2
(45) Date of Patent: Sep. 7, 2010

(54) ORIGINAL CONVEYING APPARATUS, ORIGINAL CONVEYING PROGRAM, AND ORIGINAL CONVEYING METHOD

(75) Inventor: Seiji Iino, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 178 days.

(21) Appl. No.: 12/015,726

(22) Filed: Jan. 17, 2008

(65) Prior Publication Data

US 2008/0170873 A1 Jul. 17, 2008

Related U.S. Application Data

(60) Provisional application No. 60/885,281, filed on Jan. 17, 2007.

(51) Int. Cl.
*G03G 21/00* (2006.01)
(52) U.S. Cl. .......................... 399/98; 399/367
(58) Field of Classification Search .................. 399/98, 399/99, 71, 365, 367; 358/474, 496
See application file for complete search history.

(56) References Cited

U.S. PATENT DOCUMENTS

| | | | |
|---|---|---|---|
| 7,196,827 B2* | 3/2007 | Yamanaka | 358/496 |
| 7,248,812 B2* | 7/2007 | Tombs | 399/98 |
| 7,495,810 B2* | 2/2009 | Shiraishi | 358/474 |
| 2007/0201113 A1* | 8/2007 | Nishikawa et al. | 358/506 |
| 2008/0316544 A1* | 12/2008 | Hiromatsu et al. | 358/448 |

FOREIGN PATENT DOCUMENTS

| | | | |
|---|---|---|---|
| JP | 2005-006109 | | 1/2005 |
| JP | 2005-330032 A | * | 12/2005 |

* cited by examiner

*Primary Examiner*—Sophia S Chen
(74) *Attorney, Agent, or Firm*—Turocy & Watson, LLP

(57) ABSTRACT

The present invention provides an original conveying apparatus, an original conveying program, and an original conveying method that can change a conveying angle of an original with respect to a scanning point of a scanning apparatus to an angle suitable for removing a foreign matter on the scanning point and an angle suitable for scanning. An original conveying apparatus that can convey an original to a scanning point where a scanning apparatus scans the original includes a conveying unit that conveys the original and a conveying-angle changing unit that can change a conveying angle of the original conveyed by the conveying unit with respect to the scanning point.

15 Claims, 13 Drawing Sheets

ORIGINAL CONVEYING APPARATUS, ORIGINAL CONVEYING PROGRAM, AND ORIGINAL CONVEYING METHOD

BACKGROUND OF THE INVENTION

1. Field of the Invention

The present invention relates to a technique for removing foreign matter present at a scanning point of an original in an original conveying apparatus.

2. Description of the Related Art

Conventionally, there is known an ADF (Auto Document Feeder) that conveys, in an image forming apparatus such as a printer or a digital multifunction peripheral, an original such that the original can be scanned by a CIS (Contact Image Sensor), which is a scanning unit of the image forming apparatus.

As a technique for detecting presence or absence of foreign matter on an original glass of the CIS, there is known a technique for arranging a member having a high reflectance on the ADF side facing the original glass, detecting the foreign matter by detecting a value of a reflectance different from that of the member on the basis of an output of a scanning unit that receives reflected light of the member, and notifying a user of the foreign matter.

However, in the technique, a result of the detection of the foreign matter is only notified to the user. When scanning of an original is not stopped after the notification, an image failure occurs in an output image. When the scanning of the original is stopped, since a copy or scan operation is suspended, waste of resources or time is caused.

There is also known a technique for removing foreign matter on a scanning point on an original glass by always closely attaching an original to the scanning point (JP-A-2003-321143). However, a conveying angle suitable for scanning the original and a conveying angle suitable for removing the foreign matter are different.

SUMMARY OF THE INVENTION

It is an object of the present invention to provide an original conveying apparatus, an original conveying program, and an original conveying method that can change a conveying angle of an original with respect to a scanning point of a scanning apparatus to an angle suitable for removing a foreign matter on the scanning point and an angle suitable for scanning.

In order to solve the problems described above, according to an aspect of the present invention, there is provided an original conveying apparatus that can convey an original to a scanning point where a scanning apparatus scans the original, the original conveying apparatus including a conveying unit that conveys the original and a conveying-angle changing unit that can change a conveying angle of the original conveyed by the conveying unit with respect to the scanning point.

According to another aspect of the present invention, there is provided an original conveying program for conveying an original to a scanning point where a scanning apparatus scans the original, the original conveying program causing a computer to execute changing a conveying angle of the original with respect to the scanning point and conveying the original at the changed conveying angle.

According to still another aspect of the present invention, there is provided an original conveying method for conveying an original to a scanning point where a scanning apparatus scans the original, the original conveying method including changing a conveying angle of the original with respect to the scanning point and conveying the original at the changed conveying angle.

DESCRIPTION OF THE EMBODIMENTS

Embodiments of the present invention will be hereinafter explained with reference to the accompanying drawings.

First Embodiment

Figure 1:
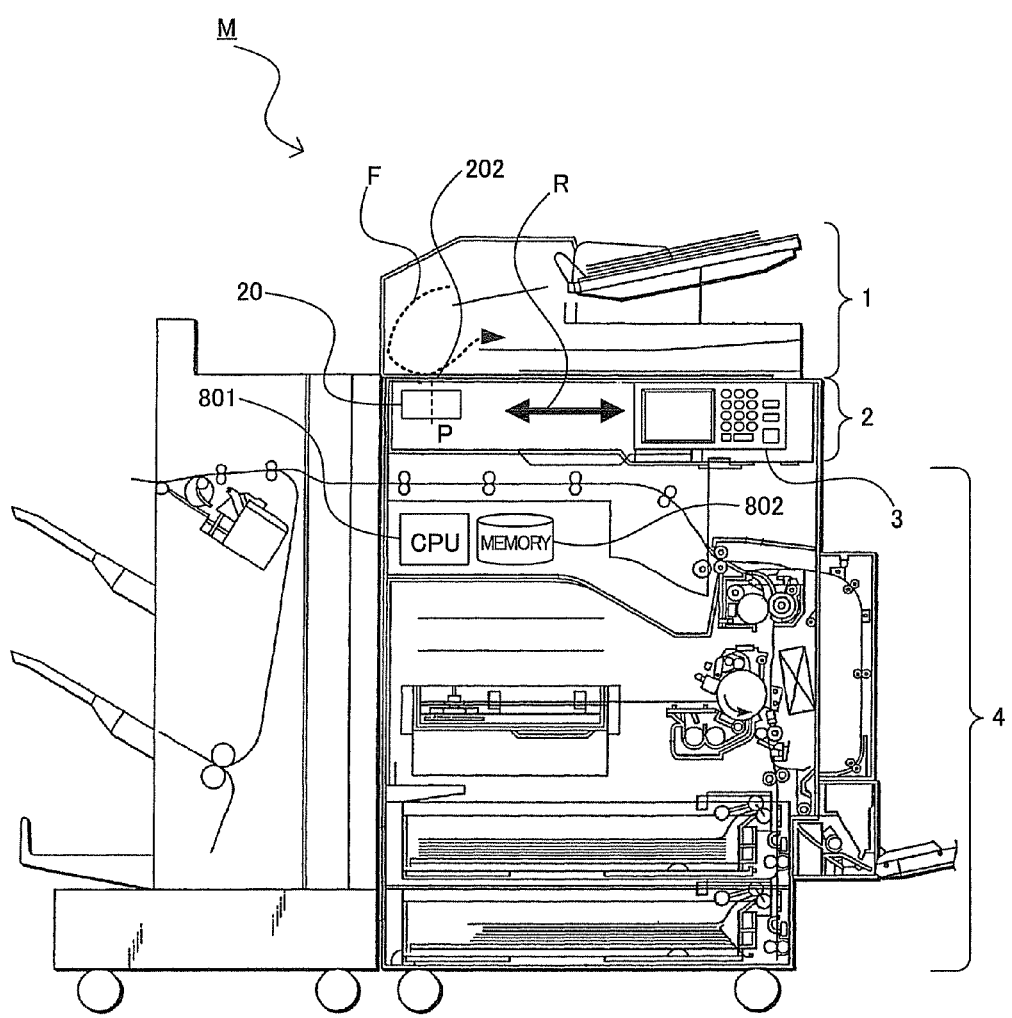
FIG. 1 is a diagram schematically showing an original conveying apparatus, a scanning apparatus, an operation panel, an image forming apparatus, and an image processing apparatus including these apparatuses according to a first embodiment of the present invention.

FIG. 1 is an overall diagram for explaining an original conveying apparatus, a scanning apparatus, an operation panel, an image forming apparatus, and an image processing apparatus (MFP: Multi Function Peripheral) including these apparatuses according to an embodiment of the present invention. It is assumed that the original conveying apparatus is set to be capable of opening and closing with respect to the scanning apparatus.

An image processing apparatus M shown in FIG. 1 includes an original conveying apparatus 1, a scanning apparatus 2, an operation panel 3, and an image forming apparatus 4. The image forming apparatus 4 can apply image formation processing (print processing, copy processing, etc.) to a sheet on the basis of image data received from an external apparatus or image data obtained by scanning, with the scanning apparatus 2, an original conveyed by the original conveying apparatus 1. The image forming apparatus 4 includes a CPU 801 and a memory 802 for performing the processing.

The scanning apparatus 2 moves, in a predetermined direction R, a CIS (Contact Image Sensor) 20 including a light source for illuminating an original and an optical system and an imaging unit for imaging reflected light from an original surface illuminated by the light source. Consequently, the scanning apparatus 2 is capable of performing manual scanning for scanning an image of an original placed on the original glass 202 and ADF scanning for scanning, with the CIS 20 standing still in a predetermined position P, an image of an original conveyed in an F direction by an ADF (Automatic Document Feeder). In this embodiment, it is assumed that the original scanning apparatus 2 performs ADF scanning.

The operation panel 3 (an information presenting unit) includes a display. Information for a user is displayed on the display. The original conveying apparatus 1 is explained below with reference to FIG. 2.

Figure 2:
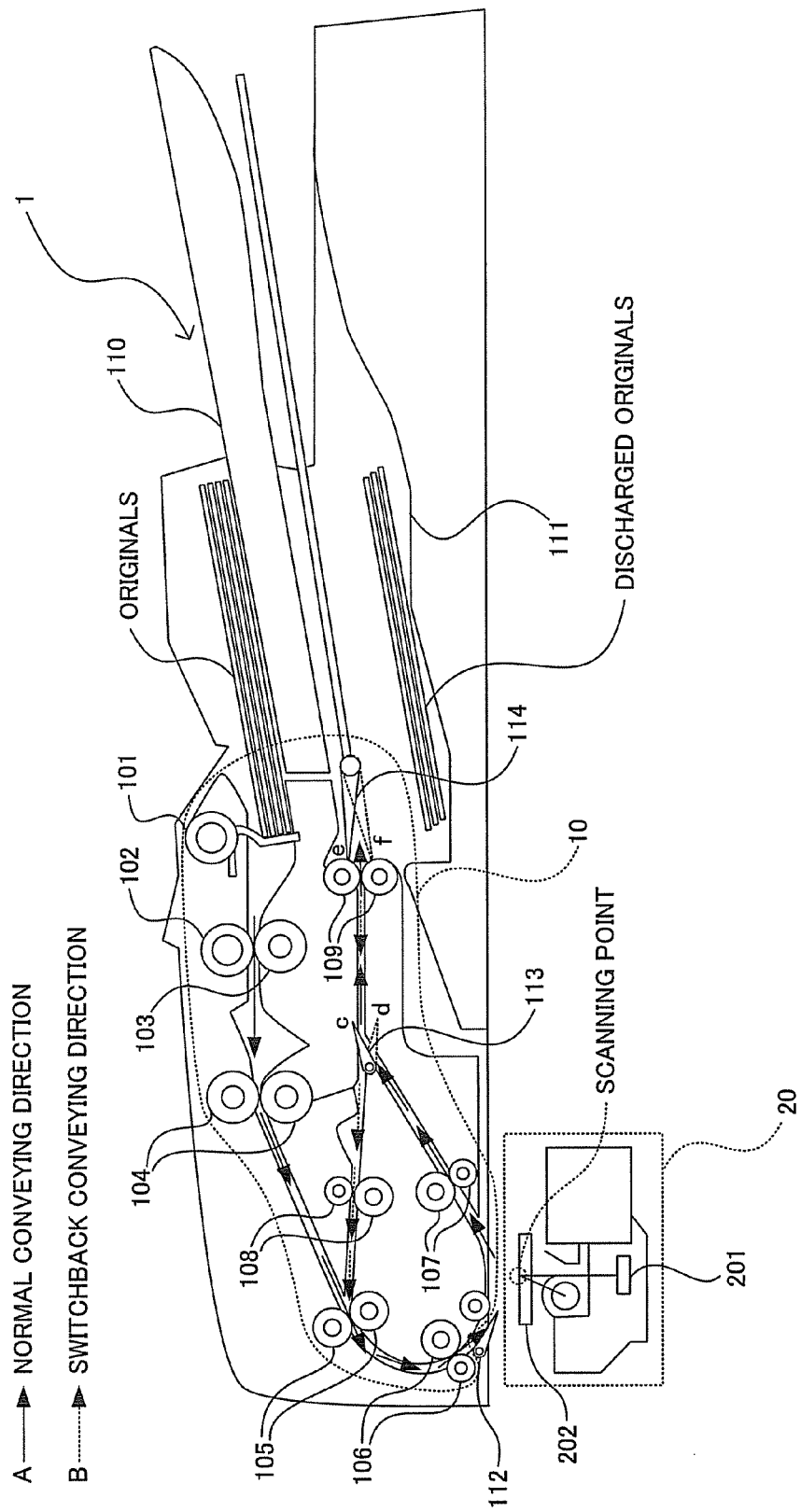
FIG. 2 is a diagram schematically showing the original conveying apparatus and a CIS according to the first embodiment.

FIG. 2 is a sectional view for schematically explaining the structure of the original conveying apparatus 1 and the CIS 20 according to this embodiment. In this embodiment, the original conveying apparatus 1 is an RADF (Reversing Automatic Document Feeder) that can convey an original to the scanning apparatus 2 to allow the scanning apparatus to scan both sides of the original.

The original conveying apparatus 1 includes a pickup roller 101, a paper feeding roller 102, a separation roller 103, registration rollers 104, intermediate conveyance rollers 105, pre-scanning rollers 106, post-scanning rollers 107, reversing registration rollers 108, paper discharge reversing rollers 109, an original tray 110, an original discharge tray 111, a first conveyance guide 112 (a conveying-angle changing unit), a second conveyance guide 113, and a third conveyance guide 114. The CIS 20 includes a CCD 201 (a foreign matter detecting unit) and an original glass 202.

The original glass 202 is a place where an original passes during original scanning. The CCD 201 scans the original that passes over the original glass 202. A predetermined position on the original glass 202 is a scanning point where the CCD 201 scans the original. In this embodiment, foreign matter on the scanning point is removed by a leading end of the original conveyed by the original conveying apparatus 1.

The pickup roller 101 conveys originals stacked on the original tray 110 to the paper feeding roller 102. The paper feeding roller 102 is driven to rotate in a normal conveying direction indicated by an arrow A. The separation roller 103 is provided to be opposed to the paper feeding roller 102. The separation roller 103 is driven to rotate in a direction opposite to a rotating direction of the paper feeding roller 102 to thereby convey one original to the paper feeding roller 102.

The registration rollers 104, the intermediate conveyance rollers 105, the pre-scanning rollers 106, and the post-scanning rollers 107 are driven to rotate in the normal conveying direction indicated by the arrow A.

The paper discharge reversing rollers 109 are driven to rotate in the normal conveying direction and discharge an original to the original discharge tray 111. The paper discharge reversing rollers 109 are also driven to rotate in a switchback conveying direction indicated by an arrow B when the original is switchback-conveyed in order to scan both sides of the original.

The second conveyance guide 113 is pushed by an original and faces a "c" direction when the original is conveyed in the normal conveying direction from the post-scanning rollers 107. When the original is conveyed in the switchback conveying direction from the paper discharge reversing rollers 109, the second conveyance guide 113 faces a "d" direction, which is a direction in an initial state. Consequently, the second conveyance guide 113 prevents the original conveyed in the switchback conveying direction from being conveyed in a direction of the post-scanning rollers 107.

The third conveyance guide 114 faces an "e" direction when an original is conveyed in the normal conveyance direction and conveys the original to the original discharge tray 111. When the original is conveyed in the switchback conveying direction, the third conveyance guide 114 faces an "f" direction and prevents the original from being discharged.

The reversing registration rollers 108 convey an original conveyed in the switchback conveying direction by the paper discharge reversing rollers 109 to the intermediate conveyance rollers 105.

The first conveyance guide 112 is a flapper that changes, in the original scanning processing and the foreign matter removal processing, a conveying angle of an original conveyed by the pre-scanning rollers 106 with respect to the original glass 202 to angles suitable for the respective kinds of processing.

The pickup roller 101, the paper feeding roller 102, the separation roller 103, the registration rollers 104, the intermediate conveyance rollers 105, the pre-scanning rollers 106, the post-scanning rollers 107, the reversing registration rollers 108, the paper discharge reversing rollers 109, the second conveyance guide 113, and the third conveyance guide 114 constitute a conveying and driving unit 10 (a conveying unit).

The CPU 801, the memory 802, the CCD 201, and the operation panel 3 may be provided in the original conveying apparatus 1.

Figure 3:
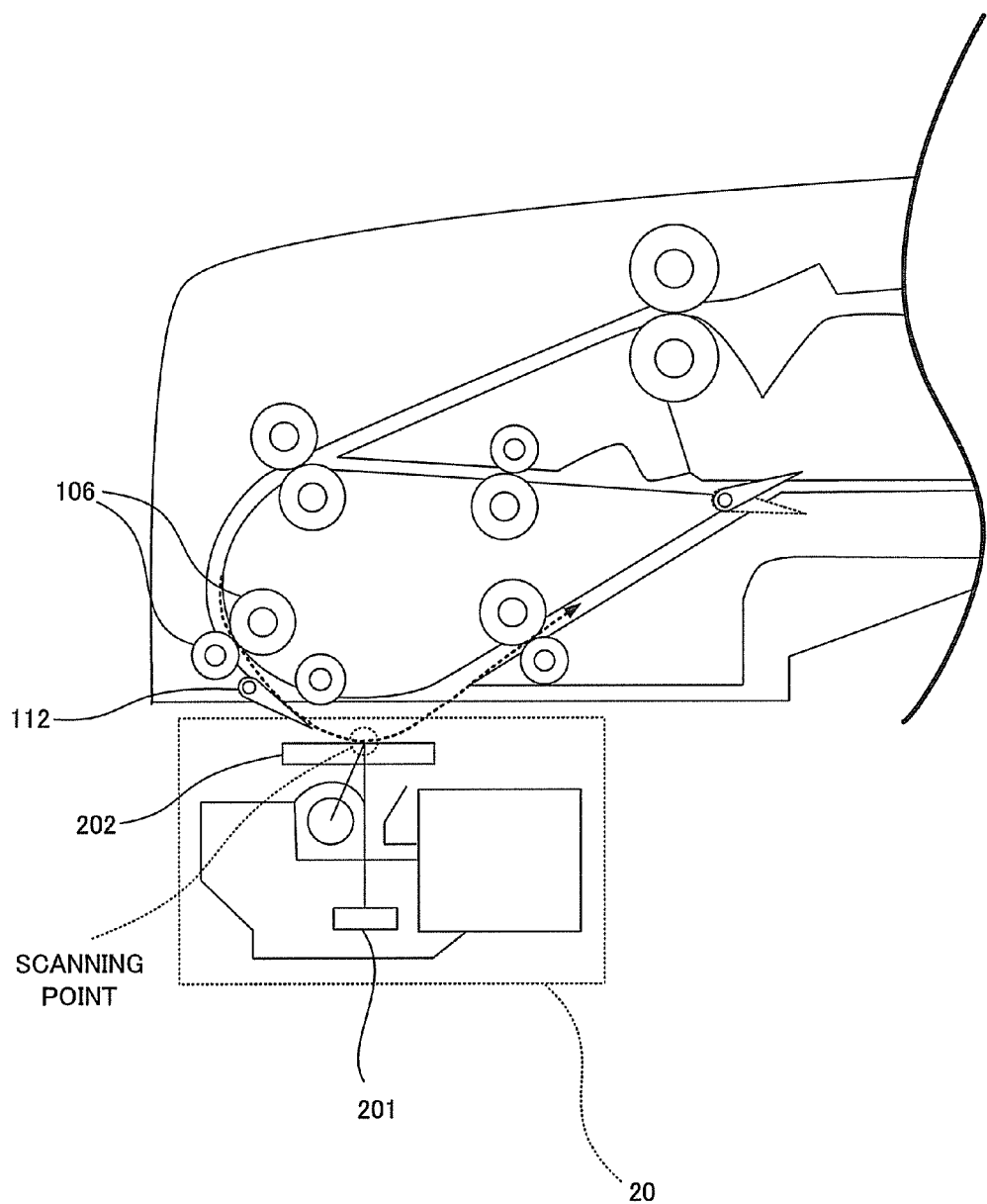
FIG. 3 is a diagram showing an original conveying direction in original scanning processing according to the first embodiment.
Figure 4:
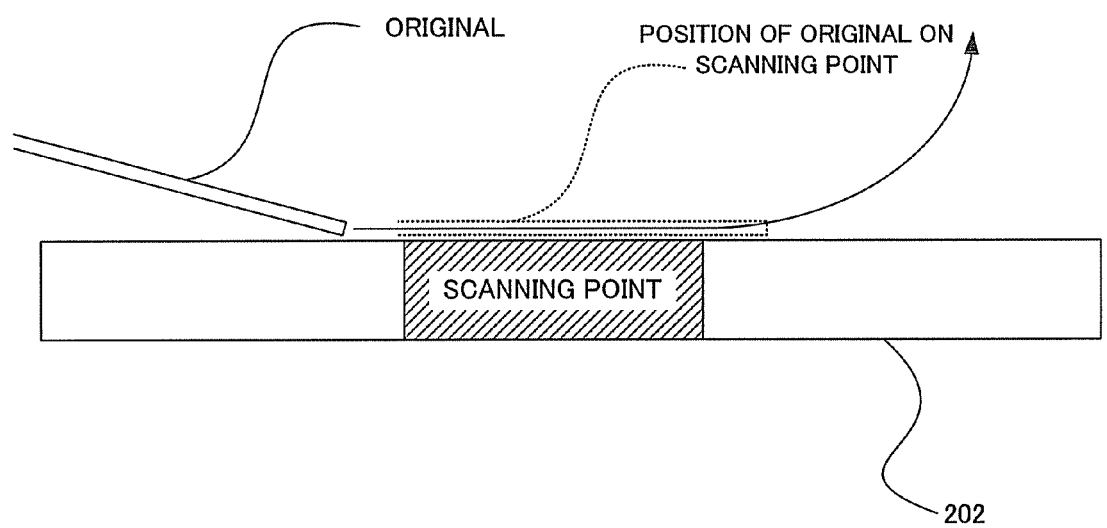
FIG. 4 is a diagram showing the original conveying direction in the original scanning processing according to the first embodiment.

Original positions and original angles in the original scanning processing and the foreign matter removal processing are explained. FIGS. 3 and 4 are diagrams showing an original conveying direction in the original scanning processing. Arrows shown in FIGS. 3 and 4 indicate the original conveying direction.

It is suitable for original scanning by the CCD 201 to convey an original parallel to the scanning point. Therefore, as shown in FIG. 3, the original conveyed by the pre-scanning rollers 106 is conveyed at an angle parallel to the scanning point of the original glass 202 by the first conveyance guide 112. Specifically, as shown in FIG. 4, a leading end of the original comes into contact with the original glass 202 before the scanning point, whereby the original keeps parallel to the original glass 202 at the scanning point. When the original keeps parallel to the original glass 202 at the scanning point, the original may be conveyed not to come into contact with the original glass 202.

Figure 5:
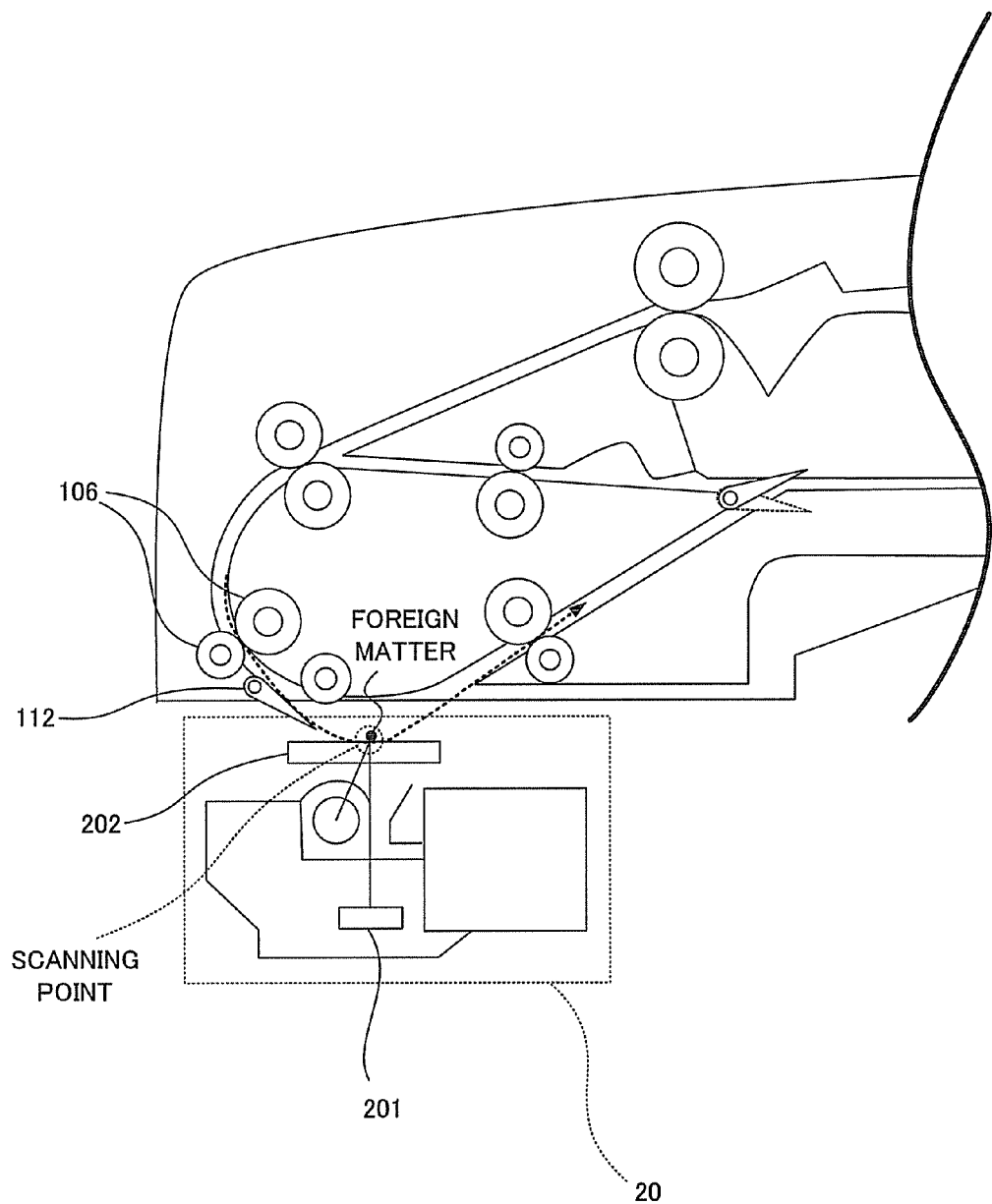
FIG. 5 is a diagram showing an original conveying direction in foreign matter removal processing according to the first embodiment.
Figure 6:
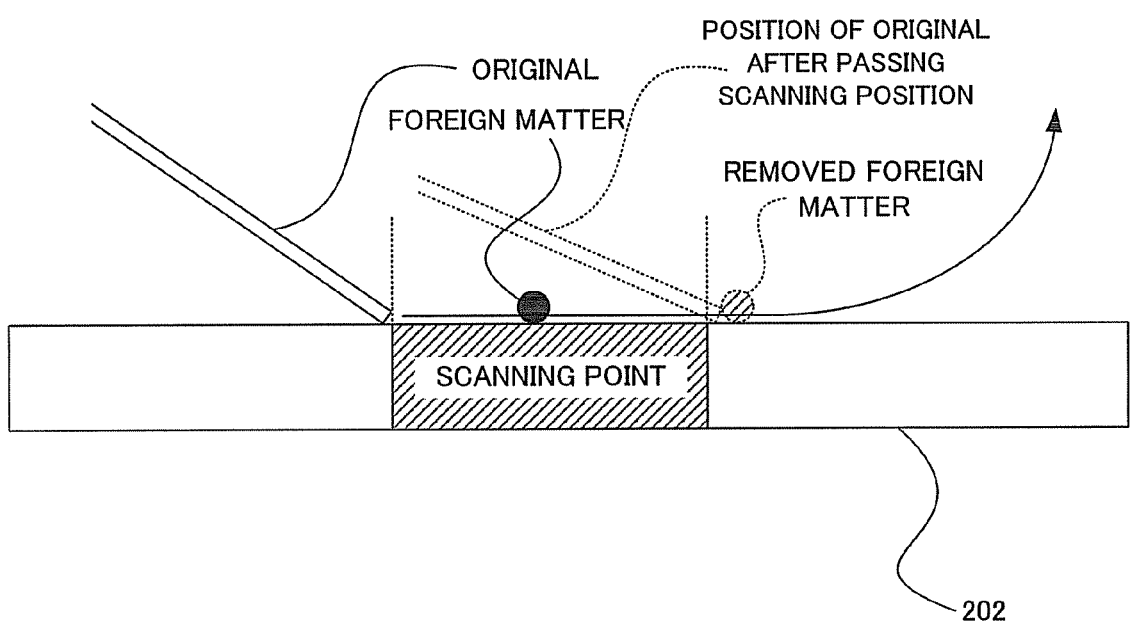
FIG. 6 is a diagram showing the original conveying direction in the foreign matter removal processing according to the first embodiment.

FIGS. 5 and 6 are diagrams showing an original conveying direction in the foreign matter removal processing. Arrows shown in FIGS. 5 and 6 indicate the original conveying direction.

As shown in FIG. 5, an original conveyed by the pre-scanning rollers 106 is conveyed by the first conveyance guide 112 while keeping a predetermined angle with respect to the scanning point of the original glass 202. Specifically, as shown in FIG. 6, a leading end of the original, which keeps the predetermined angle with respect to the scanning point, comes into contact with the original glass 202 immediately before the scanning point to thereby push out foreign matter to the outside of the scanning point. When the foreign matter is outside the scanning point, scanning of the original is not affected even if the foreign matter is on the original glass 202. Therefore, the original only has to keep the predetermined angle with respect to the original glass 202 while the leading end of the original is in contact with the scanning point.

Figure 7:
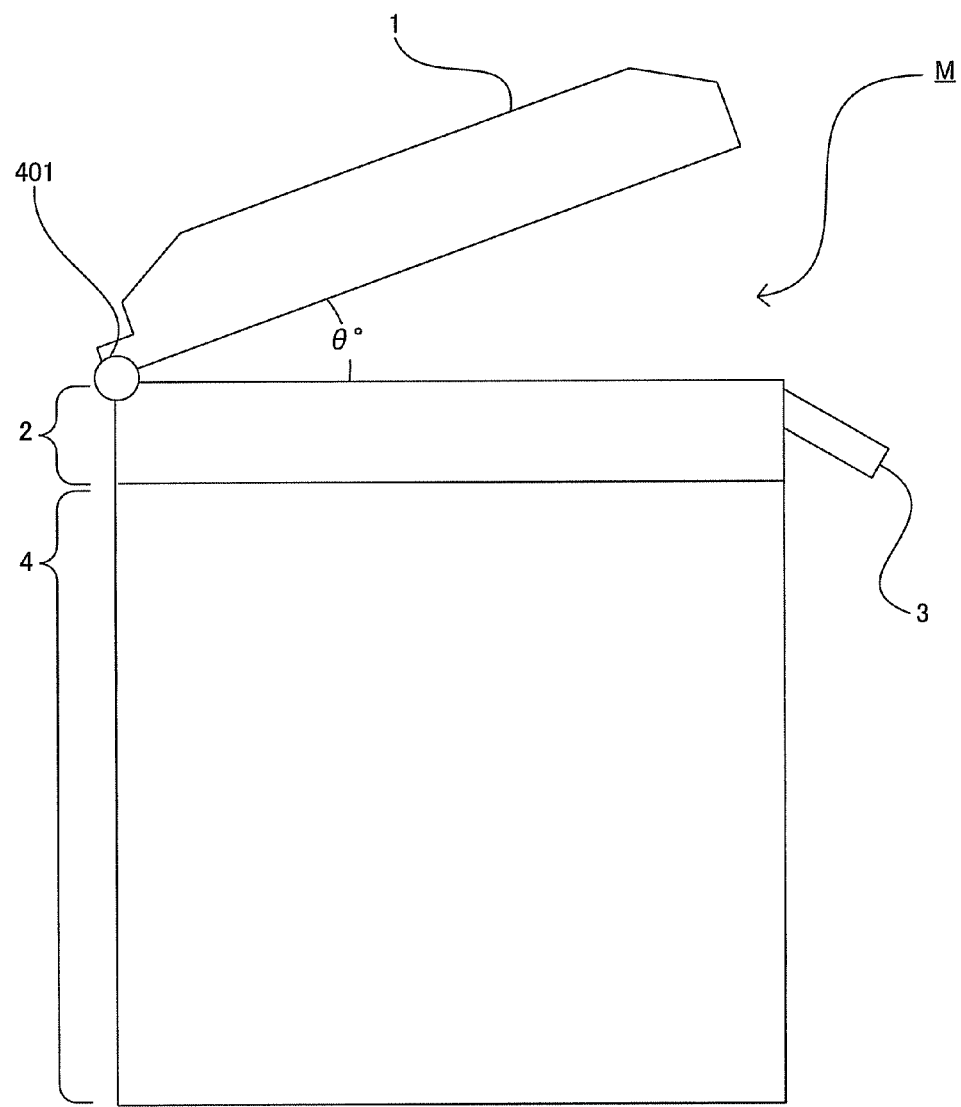
FIG. 7 is a diagram showing an opening and closing sensor and a foreign matter removing angle according to the first embodiment.

An opening and closing sensor provided in a connecting portion of the image processing apparatus and the original conveying apparatus provided to be capable of opening and closing is explained. FIG. 7 is a diagram showing the opening and closing sensor and a foreign matter removing angle.

An opening and closing sensor 401 provided in the connecting portion of the original conveying apparatus 1 provided in the image processing apparatus M detects an open angle θ° between the original conveying apparatus 1 and the image processing apparatus M. It is assumed that, in the image processing apparatus M, a foreign matter removing angle, which is an open angle of the original conveying apparatus 1, is set in advance to allow the user to remove foreign matter on the original glass 202. In this embodiment, the original conveying apparatus 1 is provided to be capable of opening and closing with respect to the image processing apparatus M. However, instead, for example, the original scanning apparatus 2 may be able to be temporarily removed or the original conveying apparatus 1 may be able to be removed as long as the user can remove foreign matter on the original glass 202.

Figure 8:
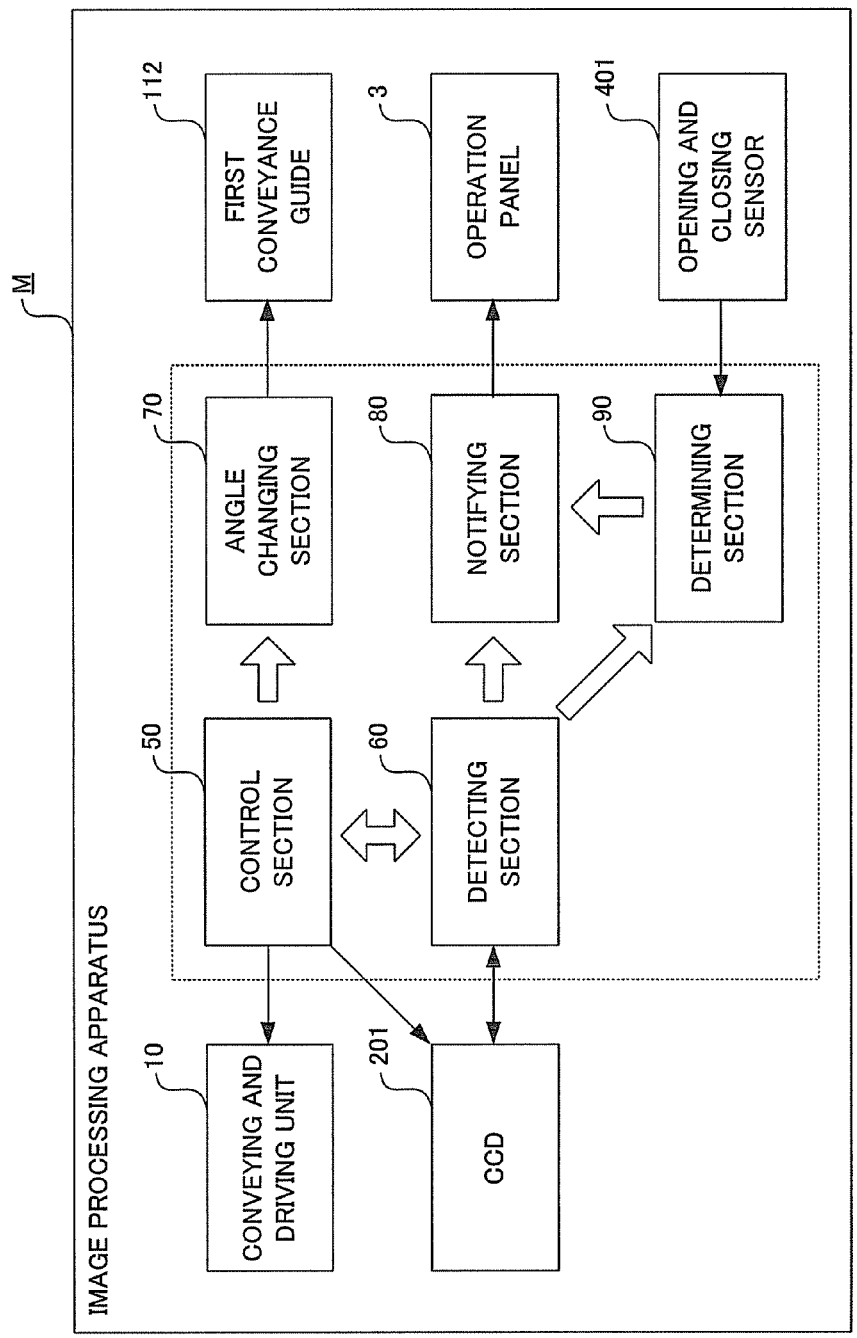
FIG. 8 is a functional block diagram of the image processing apparatus according to the first embodiment.

Functions of the image processing apparatus according to this embodiment are explained. FIG. 8 is a functional block diagram of the image processing apparatus.

In the image processing apparatus M, the CPU 801 and the memory 802 thereof form a control section 50 that controls the conveying and driving unit 10 and the CCD 201 in the original scanning processing and controls the conveying and driving unit 10 in the foreign matter removal processing, a detecting section 60 that causes the CCD 201 to image the scanning point of the original glass 202 to detect foreign matter and, when foreign matter is detected, causes the control section 50 to control the conveying and driving unit 10, an angle changing section 70 that causes the first conveyance guide 112 to change an original conveying angle when the detecting section 60 detects foreign matter, a notifying section 80 that causes the operation panel 3 to present notification to the user, and a determining section 90 that receives information concerning an angle detected by the opening and closing sensor 401 and determines whether the angle is an angle set in advance.

Figure 9:
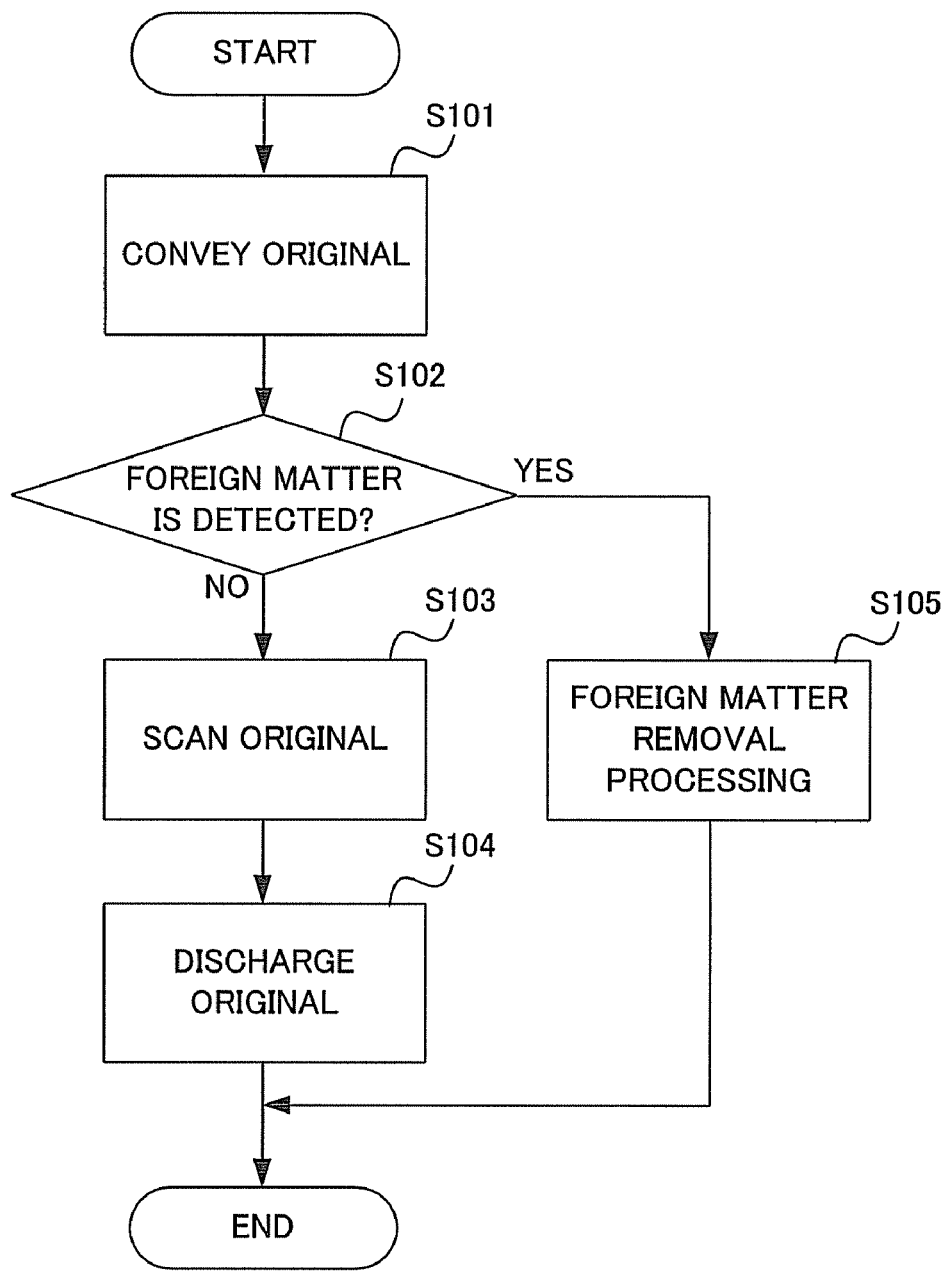
FIG. 9 is a flowchart showing an overall operation according to the first embodiment.

Operations of the image processing apparatus according to this embodiment are explained with reference to FIGS. 8 and 9. FIG. 9 is a flowchart showing an overall operation of the image processing apparatus. In this embodiment, it is assumed that the first conveyance guide is set at a scanning angle, which is an angle suitable for original scanning, in advance.

First, the control section 50 causes the conveying and driving unit 10 to convey an original (S101). Before the original reaches the pre-scanning rollers 106, the detecting section 60 causes the CCD 201 to image the scanning point of the original glass 202 and determines whether foreign matter is present on the scanning point from an image imaged by the CCD 201 (S102).

When foreign matter is not detected on the scanning point (S102, NO), the angle changing section 70 does not change an angle of the first conveyance guide 112. The CCD 201 scans the original conveyed by the conveying and driving unit 10 at the scanning point (S103). The conveying and driving unit 10 discharges the scanned original to the original discharge tray 111 (S104).

Figure 10:
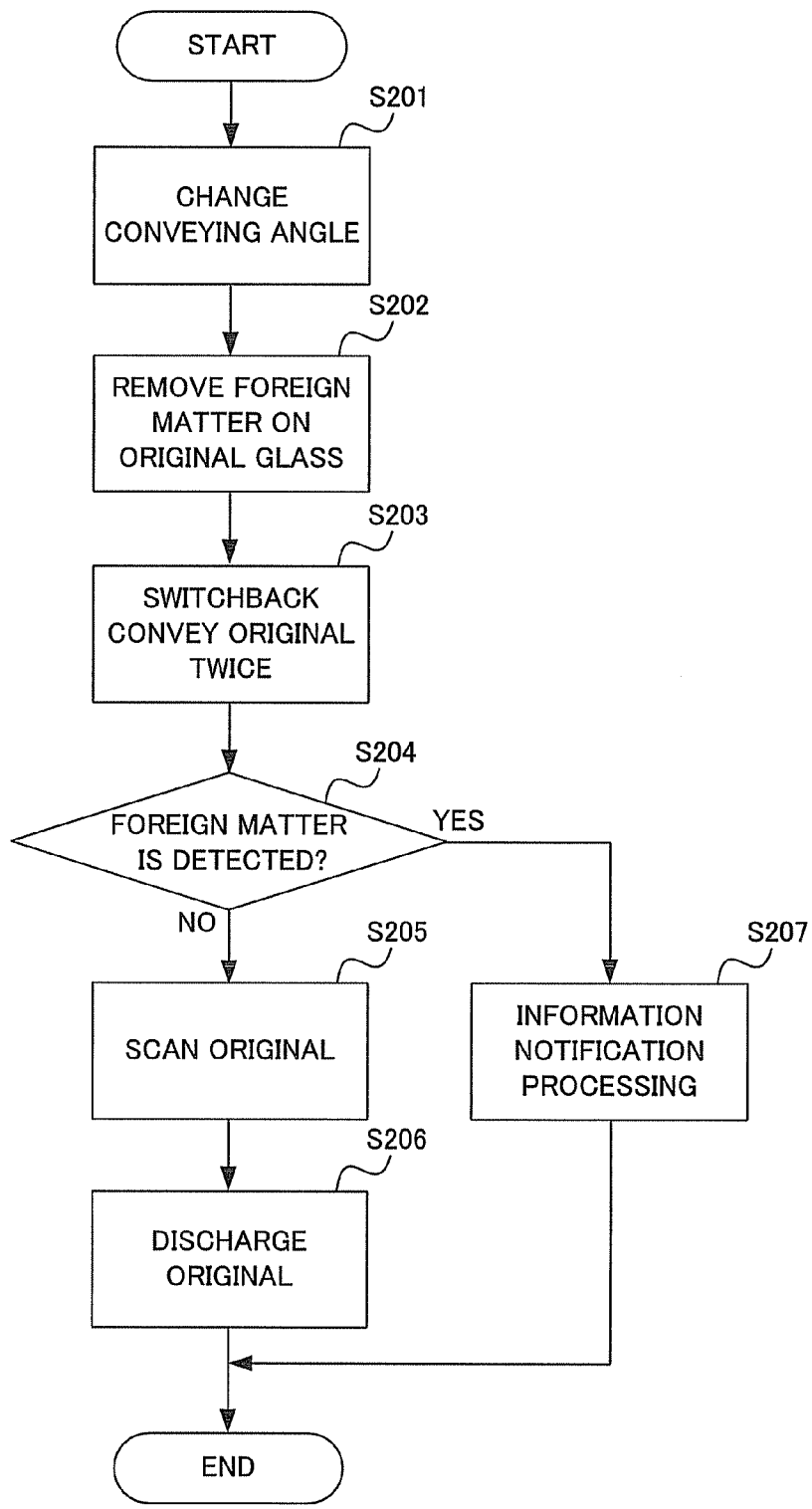
FIG. 10 is a flowchart showing an operation of the foreign matter removal processing according to the first embodiment.

On the other hand, when foreign matter is detected on the scanning point in the determination in step S102 (S102, YES), the foreign matter removal processing described later with reference to FIG. 10 is executed (S105).

FIG. 10 is a flowchart showing an operation of the foreign matter removal processing according to this embodiment. In this flowchart, it is assumed that foreign matter has been already detected and an original has been conveyed to the pre-scanning rollers 106.

The detecting section 60 that has detected the foreign matter causes, via the control section 50, the angle changing section 70 to change the angle of the first conveyance guide 112 to the foreign matter removing angle, which is an angle suitable for removal of the foreign matter on the scanning point (S201). As explained with reference to FIG. 6, the detecting section 60 causes the control section 50 to convey the original at the foreign matter removing angle (S202).

The original that removes foreign matter in step S202 has not been scanned by the CCD 201. Therefore, it is necessary to scan the original. Therefore, the control section 50 causes the conveying and driving unit 10 to switchback-convey the original twice (S203). Switchback conveyance is performed to scan both sides of the original. By performing switchback conveyance twice, it is possible to convey the original with a scanning side at the time of foreign matter removal faced down and cause the CCD 201 to scan the original. Scanning processing may be performed after the original is conveyed in a direction opposite to the conveying direction by the conveying and driving unit 10 after foreign matter removal and returned to the pre-scanning rollers 106.

Immediately after the original conveyed with its intrinsic scanning side faced down by switchback conveyance for the second time reaches the pre-scanning rollers 106, the detecting section 60 causes the CCD 201 to image the scanning point of the original glass 202 again. The detecting section 60 determines whether foreign matter is present on the scanning point from an image imaged by the CCD 201 (S204).

When no foreign matter is detected on the scanning point (S204, NO), the angle changing section 70 does not change the angle of the first conveyance guide 112. The CCD 201 scans the original conveyed by the conveying and driving unit 10 at the scanning point (S205). The conveying and driving unit 10 discharges the scanned original to the original discharge tray 111 (S206).

Figure 11:
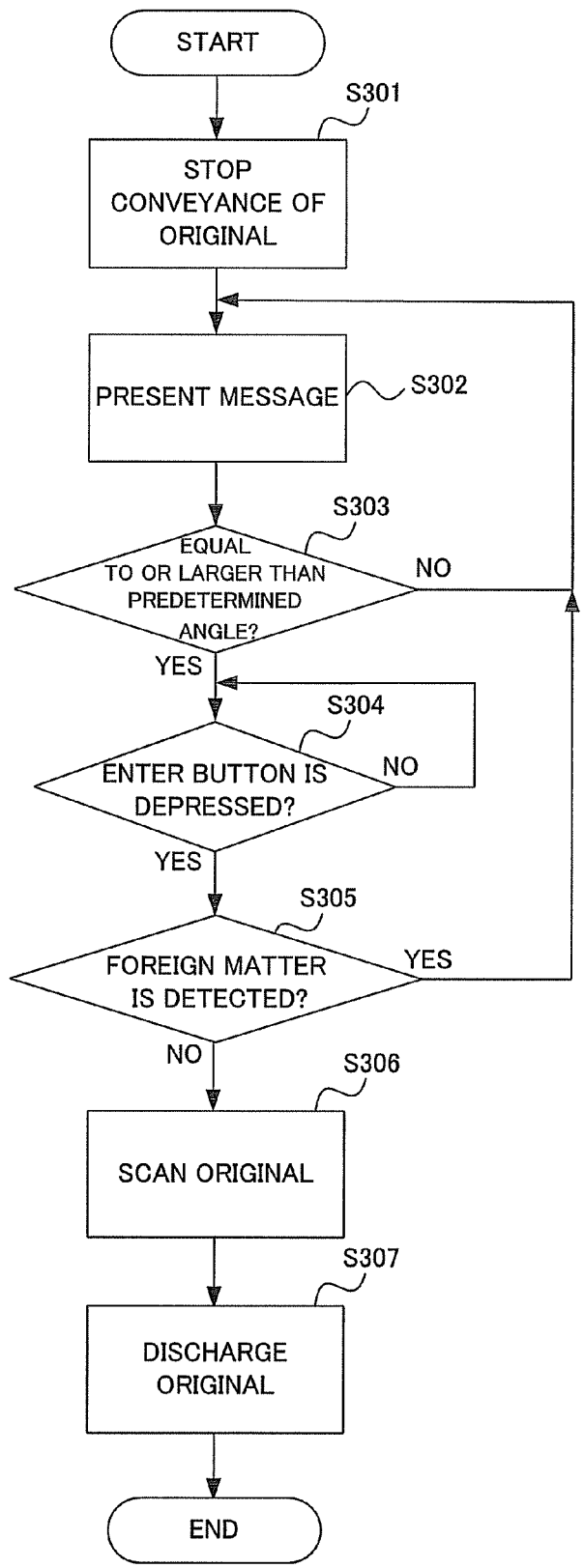
FIG. 11 is a flowchart showing an operation of information presentation processing according to the first embodiment.

On the other hand, when foreign matter is detected on the scanning point in the determination in step S204 (S204, YES), information notification processing described later with reference to FIG. 11 is executed (S207).

As described above, the angle of the first conveyance guide 112 is changed on the basis of detection of foreign matter on the scanning point of the scanning glass 202. Consequently, it is possible to convey the original at the conveying angles with respect to the scanning point suitable for the scanning processing and the foreign matter removal processing, respectively.

Figure 12:
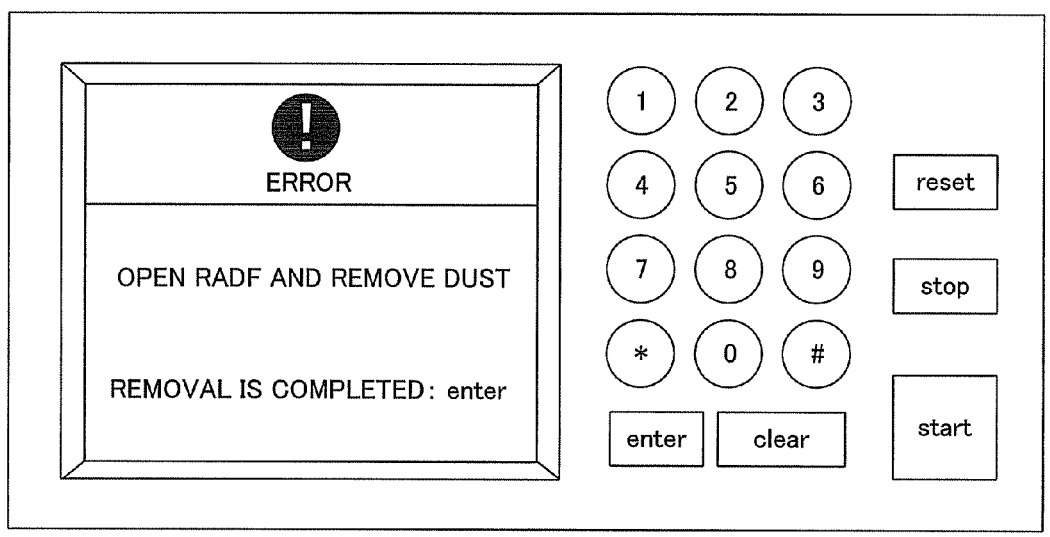
FIG. 12 is a diagram showing the operation panel that presents information to a user according to the first embodiment.

FIG. 11 is a flowchart showing an operation of the information presentation processing performed when foreign matter is not removed by the original. FIG. 12 is a diagram showing the operation panel that presents information to the user. In the flowchart shown in FIG. 11, it is assumed that foreign matter has already been detected by foreign matter detection after the foreign matter removal processing is executed.

First, the detecting section 60 causes the control section 50 to stop the operation of the conveying and driving unit 10 (S301). The detecting section 60 causes the notifying section 80 to present information shown in FIG. 12 on the display of the operation panel 3 (S302). The notifying section 80 displays, on the display of the operation panel 3, a message for recommending the user to open the original conveying apparatus 1 (RADF) and remove the foreign matter on the original glass 202 and a massage for recommending the user to press a button when the removal is completed. The notifying section 80 may recommend, with sound, the user to do the same.

The detecting section 60 causes the determining section 90 to determine whether the original conveying apparatus 1 is open (S303). At this point, the determining section 90 acquires an angle detected by the opening and closing sensor 401. The determining section 90 sets an angle sufficient for the user to remove the foreign matter on the original glass 202.

When the angle detected by the opening and closing sensor 401 is equal to or larger than a predetermined angle (S303, YES), the notifying section 80 determines whether an enter button indicating that the user has removed the foreign matter on the original glass 202 is depressed (S304).

When the enter button is depressed (S304, YES), the detecting section 60 determines again whether foreign matter is present on the scanning point (S305).

When foreign matter is not detected on the scanning point (S305, NO), the angle changing section 70 does not change the angle of the first conveying guide 112. The CCD 201 scans the original conveyed by the conveying and driving unit 10 at the scanning point (S306). The conveying and driving unit 10 discharges the scanned original to the original discharge tray 111 (S307).

On the other hand, when foreign matter is detected on the scanning point in the determination in step S305 (S305, YES), the detecting section 60 causes the notifying section 80 to present the information for the user on the operation panel 3 again (S302).

When the angle detected by the opening and closing sensor 401 is smaller than the predetermined angle in the determination in step S303 (S303, NO), the notifying section 80 continues to present the information for the user on the operation panel 3 (S302).

When the enter button is not depressed in the determination in step S304 (S304, NO), the notifying section 80 determines again whether the enter button is depressed.

When the foreign matter is not removed by the foreign matter removal processing as described above, by notifying the user to that effect, it is possible to prevent the scanning processing from being suspended.

Second Embodiment

Figure 13:
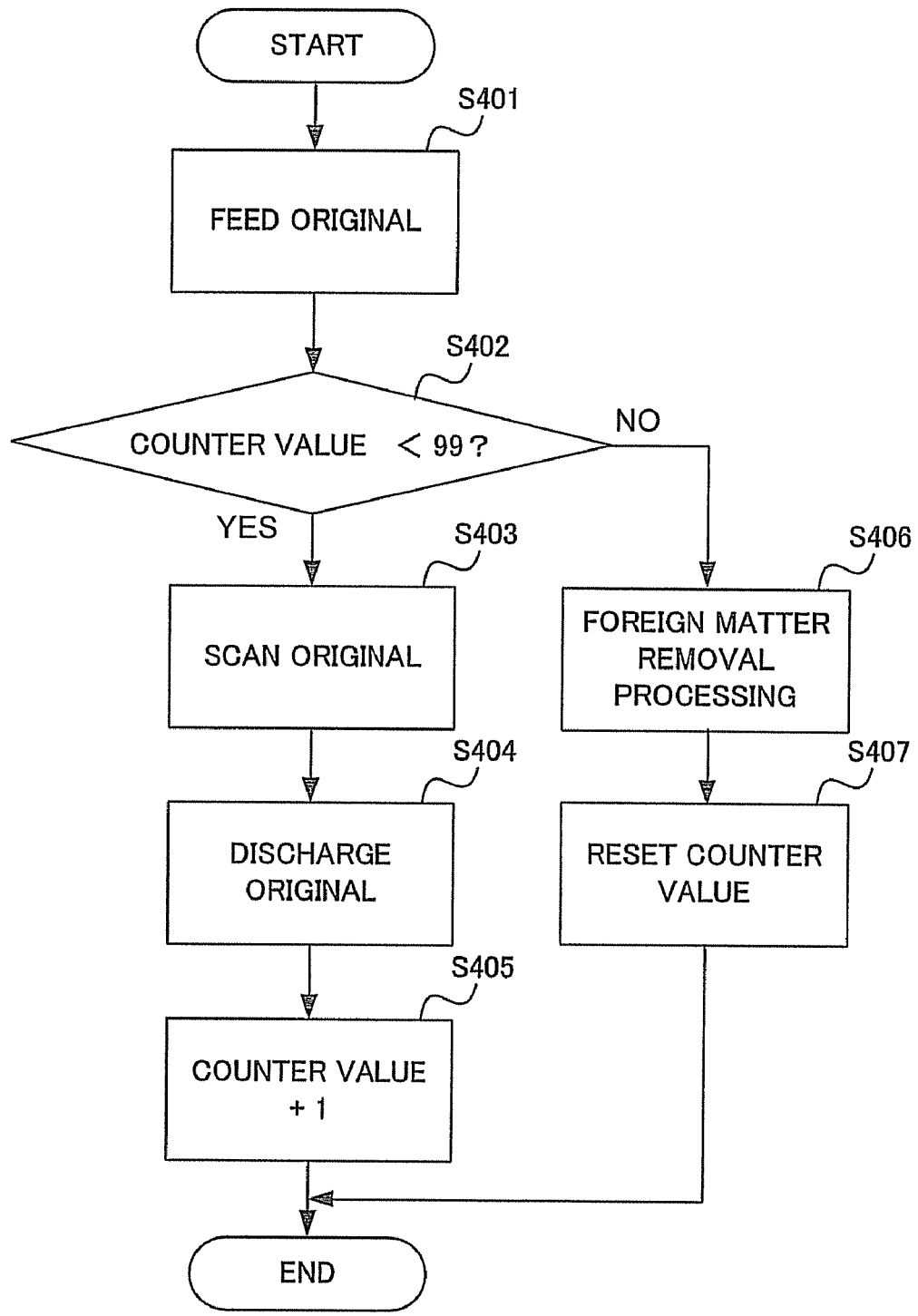
FIG. 13 is a flowchart showing an operation of foreign matter removal processing performed at predetermined timing according to a second embodiment of the present invention.

In the first embodiment, the foreign matter removal processing is performed on the basis of presence or absence of foreign matter on the scanning point. However, the foreign matter removal processing may be performed at predetermined timing regardless of presence or absence of foreign matter on the scanning point. FIG. 13 is a flowchart for explaining periodical foreign matter removal processing. It is assumed that the structure of the image processing apparatus M according to this embodiment is the same as the structure of the image processing apparatus M according to the first embodiment and the detecting section 60 holds a counter value incremented by one every time an original is discharged.

First, the control section 50 causes the conveying and driving unit 10 to convey an original (S401). The detecting section 60 determines whether a counter value is smaller than 99 (S402). When the counter value is smaller than 99 (S402, YES), the CCD 201 scans the original conveyed by the conveying and driving unit 10 at the scanning point (S403). The conveying and driving unit 10 discharges the scanned original to the original discharge tray 111 (S404). The detecting section 60 adds one to the counter value (S405).

On the other hand, when the counter value is equal to or larger than 100 in the determination in step S402 (S402, NO), processing same as the foreign matter removal processing according to the first embodiment is executed (S406). The detecting section 60 sets the counter value to 0 (S407).

The foreign matter removal processing is periodically performed at the predetermined timing as described above. Consequently, it is possible to maintain a state in which foreign matter is not present on the scanning point. In the explanation of this embodiment, the foreign matter removal processing is performed at timing based on the number of discharged originals. However, the foreign matter removal processing may be periodically performed, for example, at every time set in advance rather than at the timing based on the number of originals.

The processing described above (an original conveying method) is realized by causing the CPU 801 to execute an original conveying program stored in the memory 802.

In the explanation of this embodiment, the functions of carrying out the invention are recorded in the apparatus in advance. However, the present invention is not limited to this. The same functions may be downloaded to the apparatus from a network or the same function stored in a recording medium may be installed in the apparatus. A form of the recording medium may be any form as long as the recording medium is a recording medium such as a CD-ROM that can store programs and is readable by the apparatus. The functions obtained by installation or download in advance in this way may be realized in cooperation with an OS (Operating System) in the apparatus.

The present invention has been explained in detail with reference to the specific embodiments. However, it would be obvious for those skilled in the art that various modifications and alterations can be made without departing from the spirit and the scope of the present invention.

As described above in detail, according to the present invention, it is possible to provide an original conveying apparatus, an original conveying program, and an original conveying method that can change a conveying angle of an original with respect to a scanning point of a scanning apparatus to an angle suitable for removing a foreign matter on the scanning point and an angle suitable for scanning.

What is claimed is:

1. An original conveying apparatus that can convey an original to a scanning point where a scanning apparatus scans the original, and is on an original glass where the original passes during original scanning, the original conveying apparatus comprising:

a conveying unit configured to convey the original; and a conveying-angle changing unit configured to switch and change a conveying angle of the original conveyed by the conveying unit with respect to the scanning point to a scanning angle that is an angle suitable to scan the original conveyed to the scanning point and to a foreign matter removing angle to remove foreign matter present on the scanning point using the original conveyed to the scanning point, the foreign matter removing angle being an angle at which a leading end of original conveyed and contacted with the original glass before scanning point on the basis of the foreign matter removing angle is conveyed to a position on the original glass in a conveying direction closer to the scanning point than a leading end of original conveyed and contacted with the original glass before scanning point on the basis of the scanning angle.

2. An original conveying apparatus according to claim 1, wherein the conveying-angle changing unit switches and changes the conveying angle of the original from the scanning angle to the foreign matter removing angle periodically or at predetermined timing.

3. An original conveying apparatus according to claim 1, further comprising a foreign-matter detecting unit configured to detect foreign matter present on the scanning point, wherein
the conveying-angle changing unit switches and changes, when foreign matter is detected by the foreign-matter detecting unit, the conveying angle of the original from the scanning angle to the foreign matter removing angle.

4. An original conveying apparatus according to claim 3, further comprising an information presenting unit configured to present predetermined information to a user when foreign matter is detected by the foreign-matter detecting unit again after foreign matter is detected by the foreign-matter detecting unit and the foreign matter is removed by the original in the conveying-angle changing unit.

5. An original conveying apparatus according to claim 1, wherein the conveying-angle changing unit is a flapper provided in a conveying path of the original to the scanning apparatus to be capable of changing the conveying angle of the original with respect to the scanning point.

6. An original conveying program for conveying an original to a scanning point where a scanning apparatus scans the original, and is on an original glass where the original passes during original scanning, the original conveying program causing a computer to execute:
switching and changing a conveying angle of the original with respect to the scanning point to a scanning angle that is an angle suitable to scan the original conveyed to the scanning point and to a foreign matter removing angle to remove foreign matter present on the scanning point using the original conveyed to the scanning point, the foreign matter removing angle being an angle at which a leading end of original conveyed and contacted with the original glass before scanning point on the basis of the foreign matter removing angle is conveyed to a position on the original glass in a conveying direction closer to the scanning point than a leading end of original conveyed and contacted with the original glass before scanning point on the basis of the scanning angle; and
conveying the original at the changed conveying angle.

7. An original conveying program according to claim 6, further causing the computer to execute switching and changing the conveying angle of the original from the scanning angle to the foreign matter removing angle periodically or at predetermined timing.

8. An original conveying program according to claim 6, further causing the computer to execute:
detecting foreign matter present on the scanning point; and
switching and changing, when foreign matter is detected, the conveying angle of the original from the scanning angle to the foreign matter removing angle.

9. An original conveying program according to claim 8, further causing the computer to execute presenting predetermined information to a user when foreign matter is detected again after foreign matter present on the scanning point is detected and the original is conveyed at the foreign matter removing angle.

10. An original conveying program according to claim 6, wherein a flapper provided in a conveying path of the original to the scanning apparatus to be capable of changing the conveying angle of the original with respect to the scanning point is controlled to change the conveying angle.

11. An original conveying method for conveying an original to a scanning point where a scanning apparatus scans the original, and is on an original glass where the original passes during original scanning, the original conveying method comprising:
switching and changing a conveying angle of the original with respect to the scanning point to a scanning angle that is an angle suitable to scan the original conveyed to the scanning point and to a foreign matter removing angle to remove foreign matter present on the scanning point using the original conveyed to the scanning point, the foreign matter removing angle is an angle at which a leading end of an original conveyed and contacted with the original glass before scanning point on the basis of the foreign matter removing angle is conveyed to a position on the original glass in a conveying direction closer to the scanning point than a leading end of an original conveyed and contacted with the original glass before scanning point on the basis of the scanning angle; and
conveying the original at the changed conveying angle.

12. An original conveying method according to claim 11, further comprising switching and changing the conveying angle of the original from the scanning angle to the foreign matter removing angle periodically or at predetermined timing.

13. An original conveying method according to claim 11, further comprising:
detecting foreign matter present on the scanning point; and
switching and changing, when foreign matter is detected, the conveying angle of the original from the scanning angle to the foreign matter removing angle.

14. An original conveying method according to claim 11, wherein the conveying angle is changed by a flapper provided in a conveying path of the original to the scanning apparatus to be capable of changing the conveying angle of the original with respect to the scanning point.

15. An original conveying method according to claim 11, further comprising presenting predetermined information to a user when foreign matter is detected again after foreign matter present on the scanning point is detected and the original is conveyed at the foreign matter removing angle.

* * * * *